United States Patent
Ulbrich et al.

(10) Patent No.: US 10,033,238 B2
(45) Date of Patent: Jul. 24, 2018

(54) CONNECTION RING ARRANGEMENT FOR AN ELECTRICAL MACHINE

(71) Applicant: Bayerische Motoren Werke Aktiengesellschaft, Munich (DE)

(72) Inventors: Holger Ulbrich, Munich (DE); Manfred Siegling, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/438,794

(22) Filed: Feb. 22, 2017

(65) Prior Publication Data

US 2017/0163119 A1 Jun. 8, 2017

Related U.S. Application Data

(63) Continuation of application No. PCT/EP2015/072814, filed on Oct. 2, 2015.

(30) Foreign Application Priority Data

Oct. 20, 2014 (DE) .................... 10 2014 221 188

(51) Int. Cl.
 *H02K 11/00* (2016.01)
 *H02K 3/52* (2006.01)
 *H01R 39/34* (2006.01)
(52) U.S. Cl.
 CPC ............. *H02K 3/522* (2013.01); *H01R 39/34* (2013.01); *H02K 2203/09* (2013.01)
(58) Field of Classification Search
 CPC ...... H02K 2203/09; H02K 5/225; H02K 3/28; H02K 3/50; H02K 2203/12; H02K 2203/06
 See application file for complete search history.

(56) References Cited

U.S. PATENT DOCUMENTS 8,497,618 B2 * 7/2013 Kato ...................... H02K 3/522
  310/194
2005/0189828 A1 * 9/2005 Nakayama ........... B62D 5/0403
  310/71

(Continued)

FOREIGN PATENT DOCUMENTS

DE  10 2008 007 409 A1  8/2009
DE  10 2009 020 610 A1  12/2009

(Continued)

OTHER PUBLICATIONS

International Search Report (PCT/ISA/210) issued in PCT Application No. PCT/EP2015/072814 dated Mar. 16, 2016 with English translation (Six (6) pages).

(Continued)

*Primary Examiner* — Thanh Lam
(74) *Attorney, Agent, or Firm* — Crowell & Moring LLP

(57) ABSTRACT

A connection ring arrangement, includes a plurality of conducting rings, and a support element which holds the plurality of conducting rings. The support element has a projection arrangement having two projections which are designed receive the conducting ring and which extend from said conducting ring. The projection arrangement has an open end and a closed end, which closed end receives the conducting ring. The distance between the projections is at least partially smaller than the diameter of the conducting ring and at least one projection is at least partially elastically formed in a direction transverse to the longitudinal direction of the projection. The projections are designed such that the conducting ring is inserted between the projections.

10 Claims, 2 Drawing Sheets

(56) References Cited

U.S. PATENT DOCUMENTS

| | | | |
|---|---|---|---|
| 2009/0206693 A1* | 8/2009 | Calley | H02K 1/02 310/179 |
| 2009/0256439 A1* | 10/2009 | Inoue | H02K 3/522 310/71 |
| 2010/0109456 A1* | 5/2010 | Sugiyama | H02K 3/50 310/71 |
| 2013/0106250 A1 | 5/2013 | Kanada et al. | |
| 2013/0233597 A1 | 9/2013 | Suiter | |
| 2014/0246934 A1 | 9/2014 | Egami et al. | |
| 2014/0319944 A1* | 10/2014 | Tomita | H02K 3/522 310/71 |

FOREIGN PATENT DOCUMENTS

| | | |
|---|---|---|
| DE | 11 2010 005 579 T5 | 5/2013 |
| DE | 10 2012 024 122 A1 | 6/2014 |
| EP | 2 110 925 A1 | 10/2009 |
| GB | 2464680 A | 4/2010 |
| JP | 2000-333400 A | 11/2000 |
| JP | 2014-110707 A | 6/2014 |
| WO | WO 2011/146060 A1 | 11/2011 |
| WO | WO 2012/141135 A1 | 10/2012 |

OTHER PUBLICATIONS

German-language Written Opinion (PCT/ISA/237) issued in PCT Application No. PCT/EP2015/072814 dated Mar. 16, 2016 (Six (6) pages).

German-language Search Report issued in counterpart German Application No. 10 2014 221 188.3 dated Jul. 30, 2015 with partial English translation (Ten (10) pages).

* cited by examiner

CONNECTION RING ARRANGEMENT FOR AN ELECTRICAL MACHINE

CROSS REFERENCE TO RELATED APPLICATIONS

This application is a continuation of PCT International Application No. PCT/EP2015/072814, filed Oct. 2, 2015, which claims priority under 35 U.S.C. § 119 from German Patent Application No. 10 2014 221 188.3, filed Oct. 20, 2014, the entire disclosures of which are herein expressly incorporated by reference.

BACKGROUND AND SUMMARY OF THE INVENTION

The embodiments of the present invention relate to an improved connection ring arrangement for an electrical machine, in particular an electric motor.

Electric motors substantially comprise a stator and a rotor. The coils which are required for generating the magnetic fields are arranged in the stator such that the ends of said coils are routed out on an end side of the stator. In order to supply current to the coils of the electric motor, the exposed ends of the coils have to be electrically connected in accordance with the connection scheme (star connection, delta connection).

In existing electric motors, each end of a coil consists of a plurality of wire ends is interconnected. In a first work step, the open ends are connected by crimping, welding or the like. The wire ends, which can comprise an individual wire or ends which are made up of several wires, then have to be electrically connected in accordance with the connection scheme, so that a star connection, delta connection or another suitable circuit connection of the electric motor is achieved.

In existing electric motors, the coil ends are connected by inserting conducting elements which are often referred to as contact ring, connection ring or bus ring. Contact rings of the prior art are produced by complex manufacturing methods. For example, the conductive busbars have to be stamped, rolled or shaped in a similar way. In addition, the insulation resistance between the phases is ensured by complex encapsulation by plastic injection molding in dies. This requires complex and therefore expensive dies for the insulators in the stator for receiving the connection ring.

Existing electric motors, such as Hitachi Metals include connection rings. A plurality of current-carrying rails for the phases U, V, W and, optionally, for a star point with a plurality of plastic spacers, which are encapsulated by injection molding, for fixing and for mutual insulation are known in the prior art.

WO 2012/141135 A1 discloses fixing a plurality of connection rings by means of casting.

DE 10 2008 007 409 A1 describes a connection ring with contact points for receiving wire ends.

JP 2000333400 describes a cast connection ring.

DE 10 2009 020 610 A1 describes a connection spider with three connection rings and a plurality of connection lugs which are arranged on the respective connection rings, wherein the connection lugs of the connection rings are aligned with the connections of the stator, or vice versa. EP 2 110 925 A1 describes a plurality of bus rings which are positioned in relation to one another by means of a plurality of fastening elements.

Objects of the present invention include providing a connection ring arrangement which can be produced in a more efficient manner.

These objects are achieved by a connection ring arrangement having a plurality of conducting rings, wherein each conducting ring is connected to at least one winding of an electric motor. The conducting ring can be a connection ring, a contact ring, a bus ring or the like. The conducting ring can have a circular cross section. The connection ring arrangement further comprises a support element which holds a plurality of conducting rings. The support element has a projection arrangement having two projections which are designed to receive the conducting ring and to extend from said conducting ring. The projection arrangement comprises an open end and a closed end, which closed end receives the conducting ring. The distance between the projections is at least partially smaller than the diameter of the conducting ring and at least one projection is at least partially elastically formed in a direction transverse to the longitudinal direction of the projection. The projections are designed such that the conducting ring is inserted between the projections.

The projections of the projection arrangement can be arranged in the radial direction of the conducting ring. The closed ends of two projection arrangements of a support element can be arranged obliquely in relation to one another. In this embodiment, the conducting ring is held by projections which extend in the radial direction. Since two projection arrangements are arranged obliquely in relation to one another, the conducting ring is held in a stable manner.

The projections of the projection arrangement can be arranged in the axial direction of the conducting ring. The closed ends of two projection arrangements of a support element can be arranged obliquely in relation to one another. In this embodiment, the conducting rings can be arranged in the projections in a particularly simple manner.

A plurality of projection arrangements of the support element can be arranged in the axial direction of the connection ring arrangement, for example when the projections of the projection arrangement extend in the radial direction.

The support element can have a first projection arrangement and a second projection arrangement. The first projection arrangement supports the first conducting ring and is arranged such that the projections are directed in a radially outward direction. The second projection arrangement supports a second conducting ring and is arranged such that the projections are directed in a radially inward direction. As a result, two conducting rings can be arranged substantially one in the other. The two conducting rings can be arranged in a concentric manner.

The support element can have a third projection arrangement and a fourth projection arrangement. The third projection arrangement supports a third conducting ring and the projections of the third projection arrangement are directed in a radially outward direction. The third projection arrangement is arranged in the radial direction in relation to the first projection arrangement. The fourth projection arrangement supports a fourth conducting ring. The projections of the fourth projection arrangement are directed in a radially inward direction. The fourth projection arrangement is arranged in the axial direction in relation to the second projection arrangement. A support element of this kind can receive a particularly large number of conducting rings in a space-saving manner.

The first conducting ring, the second conducting ring, the third conducting ring and the fourth conducting ring can be arranged in a concentric manner.

A plurality of support elements can be arranged on the conducting rings.

The embodiments of the invention also relate to an electrical machine comprising the connection ring arrangement described above.

Other objects, advantages and novel features of the embodiments of the present invention will become apparent from the following detailed description of one or more preferred embodiments when considered in conjunction with the accompanying drawings.

DETAILED DESCRIPTION OF THE DRAWINGS

The location information used in the following description serves merely to describe the connection ring arrangement and should not be understood as being restrictive. Any desired spatial conditions can be produced by rotating and/or tilting an electrical machine.

Figure 1:
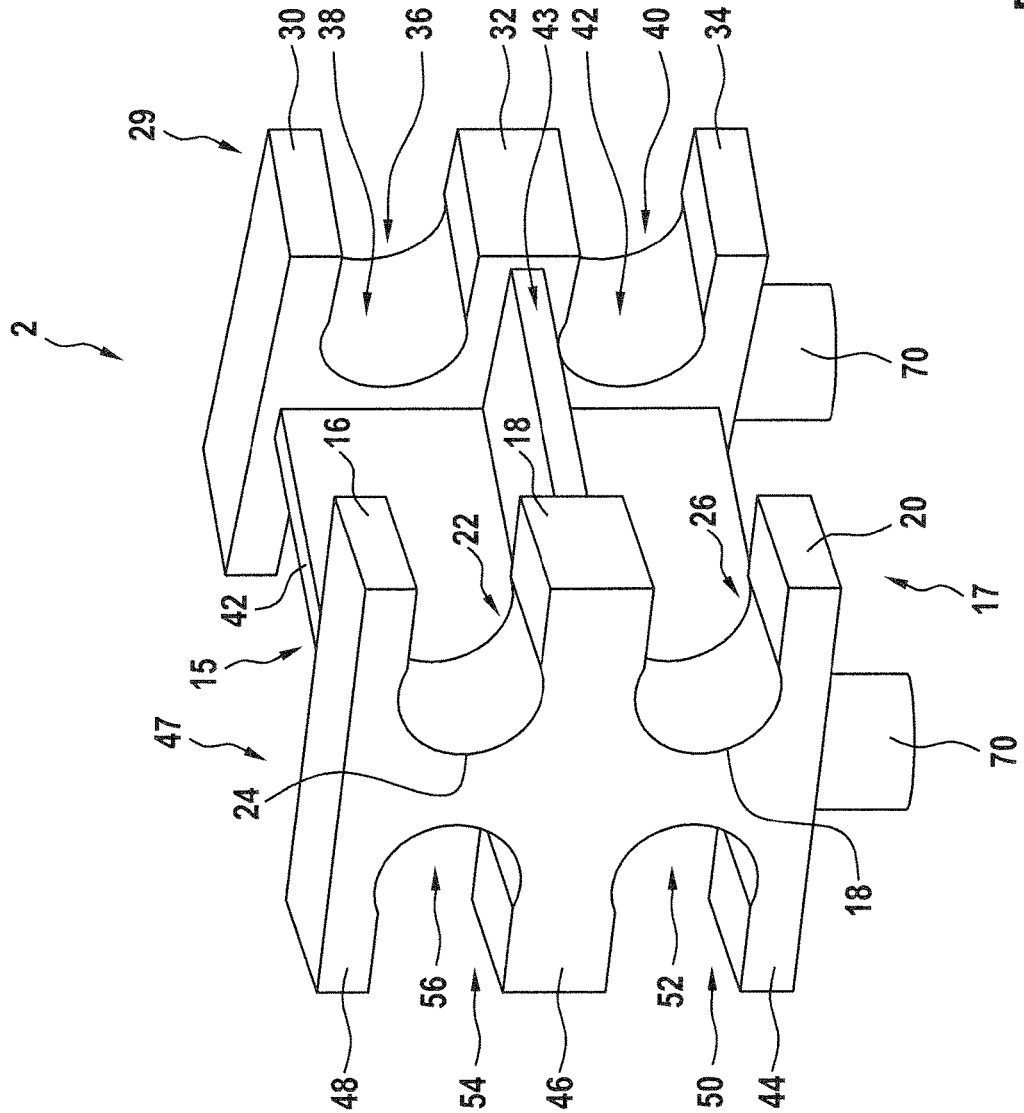
FIG. 1 is a perspective view of a support element.
Figure 2:
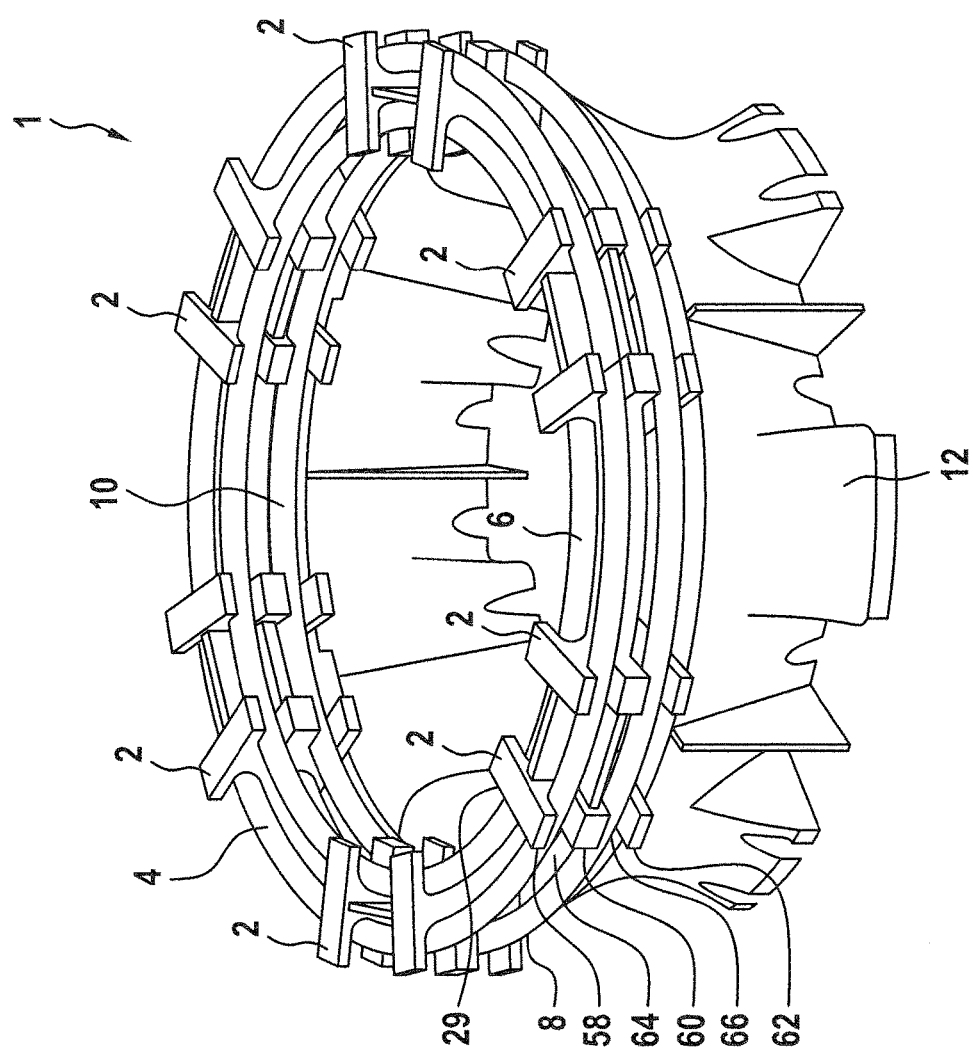
FIG. 2 is a perspective view of a connection ring arrangement comprising four connection rings and a plurality of support elements.

Reference is made to FIGS. 1 and 2. FIG. 2 shows a switch ring arrangement 1, which is arranged on a stator part 12 of an electrical machine (not shown). The switch ring arrangement comprises a first conducting ring 4, a second conducting ring 6, a third conducting ring 8 and a fourth conducting ring 10. The conducting rings are held by a plurality of support elements 2. Each support element 2 is fastened on the stator part 12 by means of a plurality of pins 70. The plurality of support elements 2 are arranged on the conducting rings 4, 6, 8, 10 equidistantly in the circumferential direction. Each conducting ring 4, 6, 8, 10 has a round cross section.

In the connection ring arrangement shown in FIG. 2, the conducting rings of 4, 6, 8, 10 are arranged in a concentric manner. The second conducting ring 6 is arranged within the first conducting ring 4. The fourth conducting ring 10 is arranged within the third conducting ring 8. Therefore, the second conducting ring 6 is arranged radially on the inside of the first conducting ring 4. The fourth conducting ring 10 is arranged radially on the inside of the third conducting ring 8. The first conducting ring 4 is arranged axially on the outside of the third conducting ring 8. The first and the third conducting ring are arranged in parallel. The second conducting ring 6 is arranged axially on the outside of the fourth conducting ring 10. The second conducting ring 6 and the fourth conducting ring 10 are arranged in parallel.

FIG. 1 shows a support element 2. A first projection arrangement 54 comprises a first projection 48 and a second projection 46. The first projection arrangement 54 supports the first conducting ring 4. The first conducting ring 4 is arranged in a recess 56 between the first projection 48 and the second projection 46 of the first projection arrangement 54 when in use. The recess 56 is curved in a concave manner in order to receive the conducting ring. The first projection 48 and/or the second projection 46 can be of elastic design, so that at least one of the projections 48 is able to move in the axial direction, so that the conducting ring can be inserted between the projections 46, 48 until it is inserted in the recess 56. Since the projections 46, 48 in the region of the recess 56 are at a greater distance than in a region outside the recess 56, the conducting ring 4 is securely held by the projection arrangement 54. The projections 46, 48 of the first projection arrangement 54 extend in a radially outward direction.

A second projection arrangement 22 comprises a first projection 16 and a second projection 18, which projections extend in a radially outward direction, and also a recess 24 for receiving the second conducting ring 6. The first projection 16 and/or the second projection 18 of the second projection arrangement 22 can be elastic in the axial direction, so that the second conducting ring 6 can be inserted into the second projection arrangement 22. The second projection arrangement 22 is arranged radially on the inside of the first projection arrangement 54.

The support element 2 further comprises a third projection arrangement 50 having a first projection 46 and a second projection 44. The first projection 46 of the third projection arrangement 50 is integrally formed with the second projection 46 of the first projection arrangement 54. The first projection 46 and/or the second projection 44 are of elastic design in the radial direction, so that the third conducting ring 8 can be inserted between the first projection 46 and the second projection 44 into the projection arrangement 50 until it is positioned in the recess 52.

The support element 2 further comprises a fourth projection arrangement 26 having a first projection 18 and a second projection 20. The first projection 18 of the fourth projection arrangement 26 is integrally formed with the second projection 18 of the second projection arrangement 22. The first projection 18 and/or the second projection 20 are elastic in the axial direction, so that the fourth connection ring 10 can be pushed between the two projections 18, 20 until it is positioned in the recess 28. The fourth projection arrangement 26 is arranged radially on the inside of the third projection arrangement 50.

The first projection arrangement 54 is arranged axially on the outside of the third projection arrangement 50. The second projection arrangement 22 is arranged axially on the outside of the fourth projection arrangement 26. The first projection arrangement 54, the second projection arrangement 22, the third projection arrangement 50 and the fourth projection arrangement 26 form a first projection group 47.

The support element 2 further comprises a second projection group 29 which is connected to the first projection group 47 by means of a curved wall 42. The second projection group 21 comprises a second projection arrangement 36 having a first projection 30, a second projection 32 and a recess 38 and also comprises a fourth projection group 40 having a first projection 32, a second projection 34 and a recess 42. FIG. 2 shows that the second projection group 29 has a first projection arrangement 64 having a first projection 58 and a second projection 60 and a recess (not shown) and also has a third projection group 66 having a first projection 60, a second projection 62 and a recess (not shown). The design and the manner of operation of the second projection group 29 correspond to the design and the functioning of the second projection group, so that further description of the second projection group 29 is rendered superfluous.

The first projection group 15 is arranged at an angle in relation to the second projection group 29. The angle between the first projection group 15 and the second projection group 29 corresponds to the segment of a circle within which the support element are arranged on the conducting rings 4, 6, 8, 10. A reinforcing means 43 is arranged at a right angle to the curved wall, said reinforcing means connecting the second projection 18 of the second projection arrangement 22 of the first projection group 47 to the second projection 32 of the second projection arrangement of the second projection group 29. Furthermore, a reinforcing wall 65 is arranged at a right angle to the curved wall 42, said reinforcing wall connecting the second projection 46 of the first projection arrangement 54 of the first projection group 47 to the second projection 60 of the first projection arrangement 64 of the second projection group 29.

The embodiments of the invention can be used in any desired electrical machine in which stator windings are interconnected. In fact, the embodiments of the invention can also be used in a rotor of an externally excited electrical machine. The conducting rings 4, 6, 8, 10 can be produced from conventional wires which can be shaped to form open rings and which are composed of copper, aluminum or any other desired electrically conductive material. The conducting rings 4, 6, 8, 10 can be both insulated and also non-insulated. The support elements 20 can be produced in a cost-effective manner from plastic, for example injection-molded material. The conducting rings 4, 6, 8, 10 can be held at a distance from one another such that they can latch into recesses 24, 28, 52, 56, 64 between the projection arrangements. The support elements 20 have, with the projection arrangements 22, 26, 36, 40, 50, 54, shaped portions for the conducting rings 4, 6, 8, 10, so that, when mounting the conducting rings, only plug-connection is performed. Consequently, complex encapsulation of the entire conducting ring arrangement 1 by injection molding is no longer necessary. If three or more conducting rings 4, 6, 8, 10 are shaped with the aid of the support elements to form a total ring 1, the connection ring arrangement 1 can be arranged on and fastened to the support elements 2 or in specially manufactured latching pieces on the stator or on other attachment parts 12 of the stator, possibly by additionally suitable contour elements 70. The conducting ring arrangement 1 can be fastened directly on the stator or indirectly by means of a phase insulation ring.

The embodiments of the invention have the advantage that complex encapsulation by injection molding and positioning of the conductor rails during manufacture of connection rings in large numbers can be avoided by using support elements which are simple to produce.

The support elements 20 can be produced in a cost-effective manner, amongst others in an injection-molding process or other suitable processes. The connection ring arrangement can be mounted quickly and simply. Furthermore, the connection ring arrangement 1 can be easily fixed to the stator of an electrical machine by suitable fastening elements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connection ring arrangement, comprising:
a plurality of conducting rings, wherein each conducting ring is connected to at least one winding of an electrical machine; and
a support element which holds the plurality of conducting rings, wherein
the support element has a projection arrangement having two projections which are designed receive the conducting ring and which extend from said conducting ring,
the projection arrangement has an open end and a closed end, which closed end receives the conducting ring,
the distance between the projections is at least partially smaller than the diameter of the conducting ring and at least one projection is at least partially elastically formed in a direction transverse to the longitudinal direction of the projection, and
the projections are designed such that the conducting ring is inserted between the projections.

2. The connection ring arrangement as claimed in claim 1, wherein the projections of the projection arrangement are arranged in the radial direction of the conducting ring and/or the closed ends of two projection arrangements of a support element are arranged obliquely in relation to one another.

3. The connection ring arrangement as claimed in claim 1, wherein the projections of the projection arrangement are arranged in the axial direction of the conducting ring and/or the closed ends of two projection arrangements of a support element are arranged obliquely in relation to one another.

4. The connection ring arrangement as claimed in claim 2, wherein a plurality of projection arrangements of a support element are arranged in the axial direction of the connection ring arrangement.

5. The connection ring arrangement as claimed in claim 4, wherein the support element has a first projection arrangement and a second projection arrangement, wherein the first projection arrangement, which supports a first conducting ring, is arranged such that the projections are directed in a radially outward direction, and the second projection arrangement, which supports a second conducting ring, is arranged such that the projections are directed in a radially inward direction.

6. The connection ring arrangement as claimed in claim 5, wherein the second conducting ring is arranged within the first conducting ring.

7. The connection ring arrangement as claimed in claim 6, wherein the support element has a third projection arrangement and a fourth projection arrangement, wherein the third projection arrangement, which supports a third conducting ring and the projections of which are directed in a radially outward direction, is arranged offset in relation to the first projection arrangement in the axial direction, and the fourth projection arrangement, which supports a fourth conducting ring and the projections of which are directed in a radially inward direction, is arranged offset in relation to the second projection arrangement in the axial direction.

8. The connection ring arrangement as claimed in claim 7, wherein the first conducting ring, the second conducting ring, the third conducting ring and the fourth conducting ring are arranged in a concentric manner.

9. The connection ring arrangement as claimed in claim 8, wherein a plurality of support elements are arranged on the conducting rings.

10. An electrical machine comprising a connection ring arrangement as claimed in claim 9.

* * * * *